United States Patent
Berhan

(10) Patent No.: US 9,322,292 B2
(45) Date of Patent: Apr. 26, 2016

(54) BEARING HAVING PRE-LOADING ELEMENT AND METHOD FOR OPERATION OF THE BEARING

(71) Applicant: Ford Global Technologies, LLC, Dearborn, MI (US)

(72) Inventor: Michael Tekletsion Berhan, Sylvania, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 604 days.

(21) Appl. No.: 13/769,049

(22) Filed: Feb. 15, 2013

(65) Prior Publication Data

US 2014/0234071 A1    Aug. 21, 2014

(51) Int. Cl.
*F16C 25/08* (2006.01)
*F16C 33/60* (2006.01)
*F01D 25/16* (2006.01)

(52) U.S. Cl.
CPC .............. *F01D 25/16* (2013.01); *F01D 25/166* (2013.01); *F16C 25/083* (2013.01); *F05D 2220/40* (2013.01)

(58) Field of Classification Search
CPC .............. F16C 19/181–19/183; F16C 19/185; F16C 25/083; F16C 33/60
USPC .................. 384/500, 504–506, 517, 518, 616
See application file for complete search history.

(56) References Cited

U.S. PATENT DOCUMENTS

| 1,332,444 | A | * | 3/1920 | Lindman | F16C 19/183 |
| | | | | | 384/517 |
| 2,866,671 | A | * | 12/1958 | Gluchowicz | F16C 35/12 |
| | | | | | 384/518 |
| 4,798,523 | A | | 1/1989 | Glaser et al. | |
| 5,421,088 | A | | 6/1995 | Kawamura | |
| 6,048,101 | A | | 4/2000 | Rasmussen | |
| 6,478,553 | B1 | | 11/2002 | Panos et al. | |
| 6,884,022 | B2 | | 4/2005 | Albright et al. | |
| 7,594,760 | B2 | | 9/2009 | Goss et al. | |
| 7,677,041 | B2 | | 3/2010 | Woollenweber | |
| 2007/0183704 | A1 | * | 8/2007 | Umekawa | F01D 25/16 |
| | | | | | 384/517 |
| 2008/0087018 | A1 | | 4/2008 | Woollenweber | |
| 2010/0104233 | A1 | | 4/2010 | Bando et al. | |

FOREIGN PATENT DOCUMENTS

| JP | 2005172099 A | 6/2005 | | |
| JP | 2006109592 A | 4/2006 | | |
| JP | 2010151293 A | 7/2010 | | |
| WO | WO 2012139830 A1 | * | 10/2012 | ............ F01D 25/125 |

* cited by examiner

*Primary Examiner* — Phillip A Johnson
(74) *Attorney, Agent, or Firm* — Julia Voutyras; Alleman Hall McCoy Russell & Tuttle LLP

(57) ABSTRACT

A bearing is provided which includes a first set of rolling elements, a second set of rolling elements spaced away from the first set of rollers, a race at least partially enclosing the first and second sets of rolling elements, and a pre-loading element in the race between two outer sections of the race applying pre-load forces to the first and second set of rolling elements. In this way, a simplified bearing structure is achieved while better maintaining pre-load forces.

19 Claims, 5 Drawing Sheets

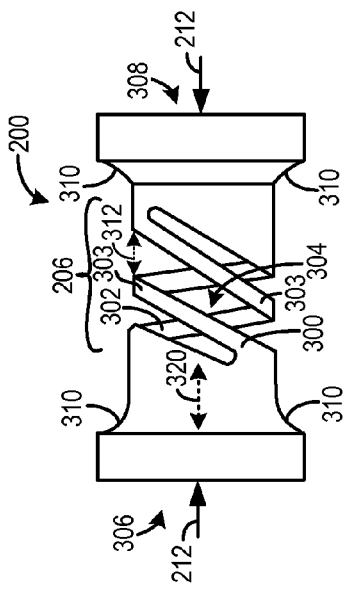
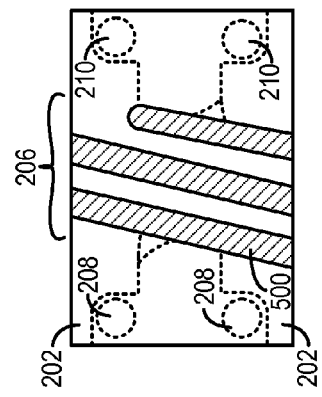
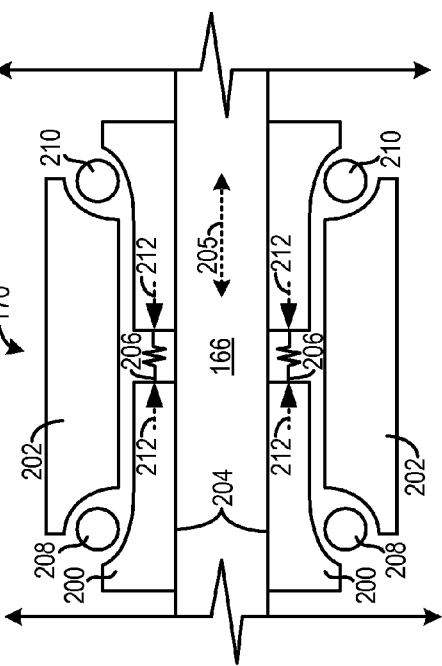
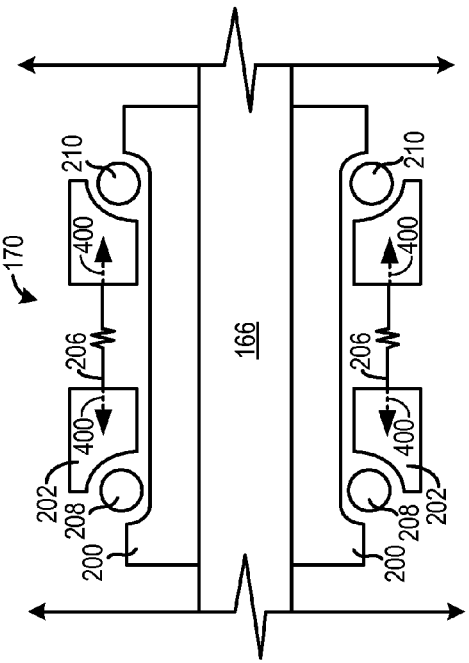

BEARING HAVING PRE-LOADING ELEMENT AND METHOD FOR OPERATION OF THE BEARING

FIELD

The present disclosure relates a bearing having a pre-loading element in a bearing race.

BACKGROUND AND SUMMARY

Turbochargers are used in engines to convert exhaust gas energy into boost provided to the intake system of the engine. Turbochargers may be used to increase the power output of engines or to downsize an engine while providing an equivalent amount of power as a larger naturally aspirated engine. In this way, the power output of the engine may be increased and/or the size of the engine may be reduced.

Turbocharger bearings are provided in turbochargers to support a turbocharger shaft and enable rotation of the shaft. Turbocharger bearings may have lower natural frequencies with higher displacements and deflections when the bearings have tolerances above a desired level and/or pre-loading below a desired level. As a result, noise, vibration, and harshness (NVH) is increased in the turbocharger, thereby increasing the likelihood of turbocharger degradation.

U.S. Pat. No. 6,048,101 discloses a bearing system including a spring positioned between two bearings, each bearing including a separate outer and inner race. The two bearings are spaced away from one another and the spring exerts a pre-load force on the separate bearings.

The inventor has recognized several drawbacks with the bearing assembly disclosed in U.S. Pat. No. 6,048,101. For example, the spring may increase the size and complexity of the bearing assembly. Moreover, it may be costly to manufacture two bearings.

The inventor herein has recognized the above issues and developed a bearing including a first set of rolling elements, a second set of rolling elements spaced away from the first set of rollers, a race at least partially enclosing the first and second sets of rolling elements, and a pre-loading element in the race between two outer sections of the race applying pre-load forces to the first and second set of rolling elements.

In this way, the pre-loading element may be integrated into the bearing race, thereby simplifying the assembly of the bearing. Further, locating the pre-loading element in the race between two outer sections to apply pre-load forces can reduce the complexity of the bearing when compared to bearings which may include additionally elements that provide a pre-loading force. As a result, the reliability of the bearing is increased and the manufacturing and/or repair cost of the bearing is reduced. The pre-loading element may also reduce the likelihood of thermal expansion of the bearing, and the resulting degrading effects of such expansion.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventor herein, and are not admitted to be known.

BRIEF DESCRIPTION OF THE DRAWINGS

FIG. 2 shows a first example turbocharger bearing that may be included in a turbocharger in the engine shown in FIG. 1;

FIG. 3 shows an inner race that may be included in the turbocharger bearing shown in FIG. 2;

FIG. 4 shows a second example turbocharger bearing that may be included in a turbocharger in the engine shown in FIG. 1;

FIG. 5 shows an example outer race that may be included in the turbocharger bearing shown in FIG. 4;

DETAILED DESCRIPTION

A bearing including a pre-loading element in a bearing race is discussed herein. The pre-loading element exerts a pre-load force on two sets of rolling elements in the bearing to decrease compliance and clearances in the bearing. In this way, a single race may be used to guide two rows of bearings as well as exert a pre-load force. The pre-loading element may be a helical spring machined, cast, or otherwise manufactured with the race. The incorporation of the pre-loading element reduces the size and complexity of the bearing. Additionally, the assembly process may be simplified when the pre-loading element is incorporated into the race. As a result, the reliability of the bearing is increased and the manufacturing and repair costs of the bearing are decreased.

Figure 1:
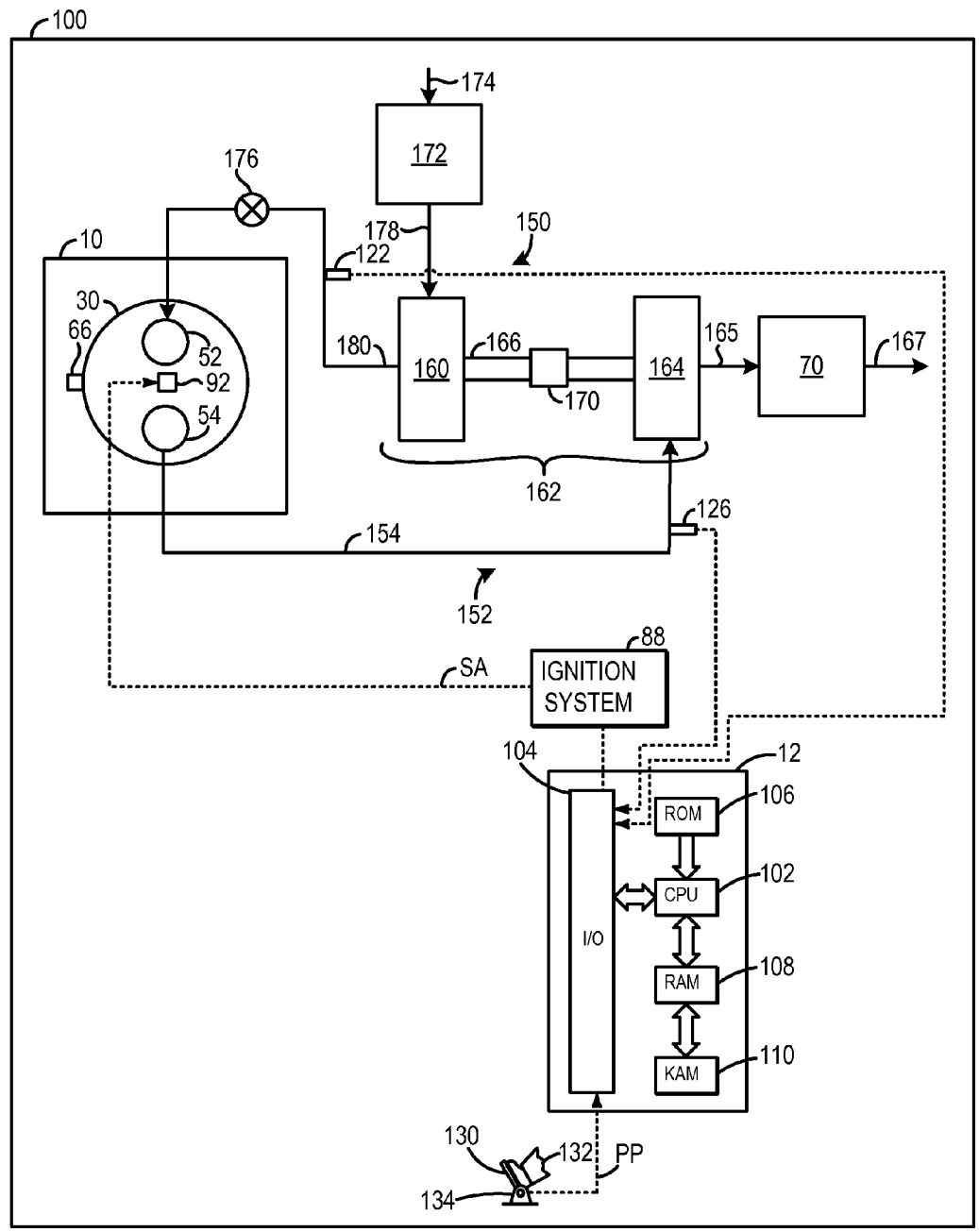
FIG. 1 shows a schematic depiction of an engine.

FIG. 1 shows a schematic diagram of an engine 10 included in a propulsion system of a vehicle 100. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Cylinder (i.e., combustion chamber) 30 of engine 10 may include combustion chamber walls (not shown) with a piston (not shown) positioned therein.

An intake system 150 and exhaust system 152 in fluidic communication with the engine 10 are also shown in FIG. 1. However, it will be appreciated that in some examples the intake system 150 and/or exhaust system 152 may be integrated into the engine 10 in some examples.

The exhaust system 152 includes an exhaust passage denoted via arrow 154 (e.g., exhaust manifold) and an emission control device 70. Arrow 156 denotes an exhaust passage coupled to an outlet of the emission control device 70. It will be appreciated that the emission control device 70 may be arranged along the exhaust passage 154. The emission control device 70 is positioned downstream of an exhaust gas sensor 126. Emission control device 70 may be a three way catalyst (TWC), NOx trap, various other emission control devices, or combinations thereof. In some examples, emission control device 70 may be a first one of a plurality of emission control devices positioned in the exhaust system. In some examples, during operation of engine 10, emission control device 70 may be periodically reset by operating at least one cylinder of the engine within a particular air/fuel ratio.

The engine 10 includes at least one cylinder 30. The cylinder 30 includes intake valve 52 and exhaust valve 54. However in other examples, the cylinder 30 may include two or more intake valves and/or two or more exhaust valves. The intake valve 52 is configured to cyclically open and close to permit and inhibit intake air from flowing from the intake system 150 to the cylinder 30. Likewise, the exhaust valve 54 is configured to cyclically open and close to permit and inhibit exhaust gas from flowing from the cylinder 30 to the exhaust system 152. The valves may be actuated by cams. Variable cam timing may be used in the engine 10, if desired. However, in other examples electronic valve actuation may be used to actuate at least one of the intake valve 52 and the exhaust valve 54.

Fuel injector 66 is shown coupled to the cylinder 30 that provides what is known as direct fuel injection to the cylinder. Fuel injector 66 may inject fuel in proportion to the pulse width of signal FPW received from controller 12 via electronic driver 68. In some examples, cylinder 30 may alternatively or additionally include a fuel injector coupled to an exhaust manifold upstream of the intake valve 52 in a manner known as port fuel injection.

Ignition system 88 can provide an ignition spark to cylinder 30 via spark plug 92 in response to spark advance signal SA from controller 12, under select operating modes. Though spark ignition components are shown, in some examples, cylinder 30 or one or more other combustion chambers of engine 10 may be operated in a compression ignition mode, with or without an ignition spark.

Exhaust gas sensor 126 is shown coupled to exhaust passage 154 of exhaust system 152 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. In some examples, exhaust gas sensor 126 may be a first one of a plurality of exhaust gas sensors positioned in the exhaust system. For example, additional exhaust gas sensors may be positioned downstream of emission control device 70.

Controller 12 is shown in FIG. 1 as a microcomputer, including microprocessor unit 102, input/output ports 104, an electronic storage medium for executable programs and calibration values shown as read only memory 106 (e.g., memory chip) in this particular example, random access memory 108, keep alive memory 110, and a data bus. Controller 12 may receive various signals from sensors included in the engine 10 such as an absolute manifold pressure signal, MAP, from sensor 122. It will be appreciated that in other examples the controller 12 may receive signals from additional sensors such as a throttle position sensor, an engine temperature sensor, an engine speed sensor, etc.

During operation, the cylinder 30 in the engine 10 typically undergoes a four stroke cycle: the cycle includes the intake stroke, compression stroke, expansion stroke, and exhaust stroke. In a multi-cylinder engine the four stroke cycle may be carried out in additional combustion chambers. During the intake stroke, generally, exhaust valve 54 closes and intake valve 52 opens. Air is introduced into cylinder 30 via an intake manifold, for example, and the piston moves to the bottom of the combustion chamber so as to increase the volume within cylinder 30. The position at which the piston is near the bottom of the combustion chamber and at the end of its stroke (e.g. when cylinder 30 is at its largest volume) is typically referred to by those of skill in the art as bottom dead center (BDC). During the compression stroke, intake valve 52 and exhaust valve 54 are closed. The piston moves toward the cylinder head so as to compress the air within cylinder 30. The point at which the piston is at the end of its stroke and closest to the cylinder head (e.g. when cylinder 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition devices such as a spark plug 92, resulting in combustion. Additionally or alternatively compression may be used to ignite the air/fuel mixture. During the expansion stroke, the expanding gases push the piston back to BDC. A crankshaft may convert piston movement into a rotational torque of the rotary shaft. Finally, during the exhaust stroke, exhaust valve 54 opens to release the combusted air-fuel mixture to an exhaust manifold and the piston returns to TDC. Note that the above is described merely as an example, and that intake and exhaust valve opening and/or closing timings may vary, such as to provide positive or negative valve overlap, late intake valve closing, or various other examples. Additionally or alternatively compression ignition may be implemented in the cylinder 30.

The intake system 150 further includes a compressor 160. The compressor 160 may be included in a turbocharger 162 also having a turbine 164 positioned in the exhaust system 152. As shown, the turbine 164 is positioned upstream of the emission control device 70. However, in other examples the turbine 164 may be positioned downstream of the emission control device. An exhaust conduit denoted by arrow 165 provides fluidic communication between the turbine 164 and the emission control device 70. Arrow 167 denotes the flow of exhaust gas from the emission control device 70 to the surrounding environment. However in other examples additional components such as emission control devices, conduits, turbines, etc., may be positioned downstream of the emission control device 70.

The turbocharger 162 also includes a drive shaft 166 mechanically coupling the 160 to the turbine 164. The drive shaft 166 is supported by a turbocharger bearing 170. The turbocharger bearing 170 also enables the drive shaft 166 to rotate. The turbocharger bearing 170 may be referred to as a bearing and may be used in alternate applications, discussed in greater detail herein. The turbocharger bearing 170 may include a pre-loading element 206 (e.g., a spring), shown in FIG. 2, in the bearing. Specifically, the pre-loading element may be in an inner race or an outer race of the bearing. Thus, the pre-loading element may be integrated or otherwise incorporated into the bearing race, in some examples.

The intake system 150 may further include a filter 172. The filter receives ambient air from the surrounding environment, denoted via arrow 174. The intake system 150 further includes a throttle 176 positioned downstream of the compressor 160. However, other suitable throttle locations have been contemplated. An intake conduit denoted via arrow 178 provides fluidic communication between the filter 172 and the compressor 160. An intake conduit denoted via arrow 180 provides fluidic communication between the compressor 160 and the intake valve 52. In some examples, the intake conduit 180 may be in fluidic communication with an intake manifold which provides intake air to the cylinder 30 via the intake valve 52.

FIG. 2 shows a cross-sectional view of an example turbocharger bearing 170. The turbocharger bearing includes an inner race 200 and an outer race 202. The inner race 200 includes an external surface 204 in face sharing contact with the drive shaft 166. A rotational axis 205 of the drive shaft 166 is shown.

The turbocharger bearing 170 further includes a pre-loading element 206. The pre-loading element 206 may at least partially enclose the drive shaft 166. The pre-loading element 206 is included in a bearing race. Specifically, in the depicted example the pre-loading element 206 is included in the outer race 202. However, in other examples, such as the example shown in FIG. 4, the pre-loading element 206 is included in the inner race 200. Integrating the pre-loading element 206 into the bearing race simplifies assembly of the bearing as well as reduces the complexity of the bearing when compared to bearings which may include additionally elements which provide a pre-loading force. As a result, the reliability of the bearing is increased and the manufacturing and/or repair costs of the bearing is reduced. The pre-loading element may also reduce the likelihood of thermal expansion of the turbocharger. Additionally, when the pre-loading element 206 is incorporated in the bearing race the bearing may be retained without external load, if desired. Thus, the turbine and compressor rotor threads may simply hold their own joint, if desired.

The pre-loading element 206 is schematically represented in FIG. 3. However, it will be appreciated that a number of suitable pre-loading elements have been contemplated, such as a helical spring.

The turbocharger bearing 170 further includes a first set of rolling elements 208 and a second set of rolling elements 210. Thus, the turbocharger bearing 170 may be referred to as a double row bearing, in some examples. The rolling elements in both the first and second sets of rolling elements are bearing balls. However, other suitable types of rolling elements have been contemplated such as cylindrical rollers, conical rollers, etc. It will be appreciated that the rolling elements may include bearing balls. The first set of rolling elements 208 are adjacent to the compressor 160, shown in FIG. 1, and the second set of rolling elements 210 are adjacent to the turbine 164, shown in FIG. 1. However, in other examples the first set of rolling elements 208 are adjacent to the turbine and the second set of rolling elements 210 are adjacent to the compressor. As shown, the outer race 202 axially extends from the first set of rolling elements 208 to the second set of rolling elements 210. The inner race 200 axially extends beyond the first set of rolling elements 208 and the second set of rolling elements 210.

The inner race 200 at least partially encloses the first set of rolling elements 208 and the second set of rolling elements 210. Likewise, the outer race 202 at least partially encloses the first set of rolling elements 208 and the second set of rolling elements 210. The inner race 200 forms a continuous piece of material. Likewise the outer race 202 forms a continuous piece of material.

Arrows 212 denote the pre-loading force generated by pre-loading element 206. The pre-loading force is in an inward direction (e.g., inward axial direction). Thus, a force may be exerted on the first set of rolling elements 208 in a direction away from the compressor 160, shown in FIG. 1, and a force may be exerted on the second set of rolling elements 210 in a direction away from the turbine 164 shown in FIG. 1. Thus, the direction of the pre-loading force may be parallel to the rotational axis 205.

It will be appreciated that when the turbocharger bearing 170 is assembled the pre-loading element is stretched (e.g., axially expanded, put in axial tension). The stretching of the pre-loading element results in exertion of a preloading force on the inner race 200 and the components surrounding the inner race 200. It will be appreciated that when a pre-loading force is exerted in the bearing race reduces deflection of the drive shaft 166, thereby reducing noise, vibration, and harshness in the turbocharger as well as increasing turbocharger reliability.

The inner race 200 and/or the outer race 202 may comprise steel (e.g., UNS G52986, UNS G86200, M50, M50 NiL, etc.) and/or ceramics such as silicon nitride. In lower temperature, speed, and/or stress applications, for example, the inner and outer race may comprise composites or polymers. In one example, the inner race 200 and the outer race 202 may comprise similar materials. However, in other examples, the inner race 200 and the outer race 202 may comprise different materials. The section of the race including the pre-loading element 206 may have a lower hardness and higher ductility, in some examples.

FIG. 3 shows an example inner race 200 included in the example turbocharger bearing 170 shown in FIG. 2. The inner race 200 comprises a continuous piece of material. However, other inner race geometries and configurations have been contemplated.

As illustrated, the pre-loading element 206 is a helical spring integrated into the inner race 200. It will be appreciated that the pre-loading element 206 may include at least a helical spring, in other examples. The helical spring 206, shown in FIG. 3, includes a first coil start 300 and a second coil start 302. Using multiple coil starts in the helical spring may balance (e.g., circumferentially balance) loads. However, a helical spring with alternate number of coil starts has been contemplated. For example, the helical spring may have only a single coil start or greater than two coil starts, in other examples. Specifically, the first coil start 300 and the second coil start 302 form a double helix type shape, in the depicted example. However, other coil start geometries have been contemplated.

An outer surface 303 of each of the coil starts are axially aligned. Additionally, the radius of the outer surfaces 303 does not exceed a radius of other surfaces in the inner race 200, in the depicted example. However, in other examples, the radius of the outer surfaces 303 may be greater than other surfaces on the inner race 200.

In the depicted example, each of the coils circumscribe a central axis 320 of the inner race 200 at least once. Thus, the coils extend at least 360 degrees around the central axis 32. The pitch 312 of the coils may be constant and/or substantially equivalent. However, in other examples the pitch of the coils may differ from coil to coil and may vary along the length of the coil. It will be appreciated that the pitch and/or number of coils may be selected to achieve a desired amount elasticity, hardness, spring rate, etc., in the helical spring.

The inner race 200 further includes a hollow central cavity 304. The hollow central cavity may axially extend from a first end 306 of the inner race 200 to a second end 308 of the inner race. However, in other examples the hollow central cavity 304 may only partially extend through the inner race 200.

The inner race 200 includes curved sections 310 that partially enclose the first and second set of rolling elements (208 and 210). Additionally, it will be appreciated that the curved sections 310 may be in contact with the rolling elements. Curved sections of the outer race 200, shown in FIG. 2, may also be in contact with the rolling elements. Additionally, a layer of lubricant (e.g., oil) may be provided between the rolling elements and the curved sections.

Again arrows 212 denote the inward axial force generated by the inner race 200 when the inner race is assembled in the turbocharger bearing 170, shown in FIG. 2, and stretched.

Specifically, the curved sections 310 may exert a force on the sets of rolling elements (208 and 210) shown in FIG. 2.

FIG. 4 shows a cross-sectional view of another example turbocharger bearing 170. The turbocharger bearing shown in FIG. 4 includes the pre-loading element 206 in the outer race 202 of the turbocharger bearing 170. Arrows 400 denote the outward force generated by the pre-loading element 206. It will appreciated that the pre-load force may be exerted on the first set of rolling elements 208 and the second set of rolling elements 210. It will be appreciated that the pre-loading element 206 may be axially compressed during assembly to provide this pre-load force. The drive shaft 166 and inner race 200 are also shown in FIG. 4.

FIG. 5 shows an example pre-loading element 206 that may be included in the turbocharger bearing 170 shown in FIG. 4. Specifically, the pre-loading element 206 is included in the outer race 202. The pre-loading element 206 shown in FIG. 5 is a helical spring including a single coil start 500. The first set of rolling elements 208 and the second set of rolling elements 210 are also shown in FIG. 5.

In some examples, the pre-loading element (e.g., helical spring) may be machined into the race before finishing or electrical discharge machining (EDM) may be used to manufacture the helical spring into an otherwise finished race. Still further in one example, induction tempering may be applied to the pre-loading element to increase the ductility. Suitable machines may be used to perform the EDM and/or the induction tempering.

In another example, the turbocharger bearing 170 may include multiple pre-loading elements, a pre-loading element included in both the inner race and outer race. In this way axial compression as well as expansion may provide a pre-load force.

Figure 6:
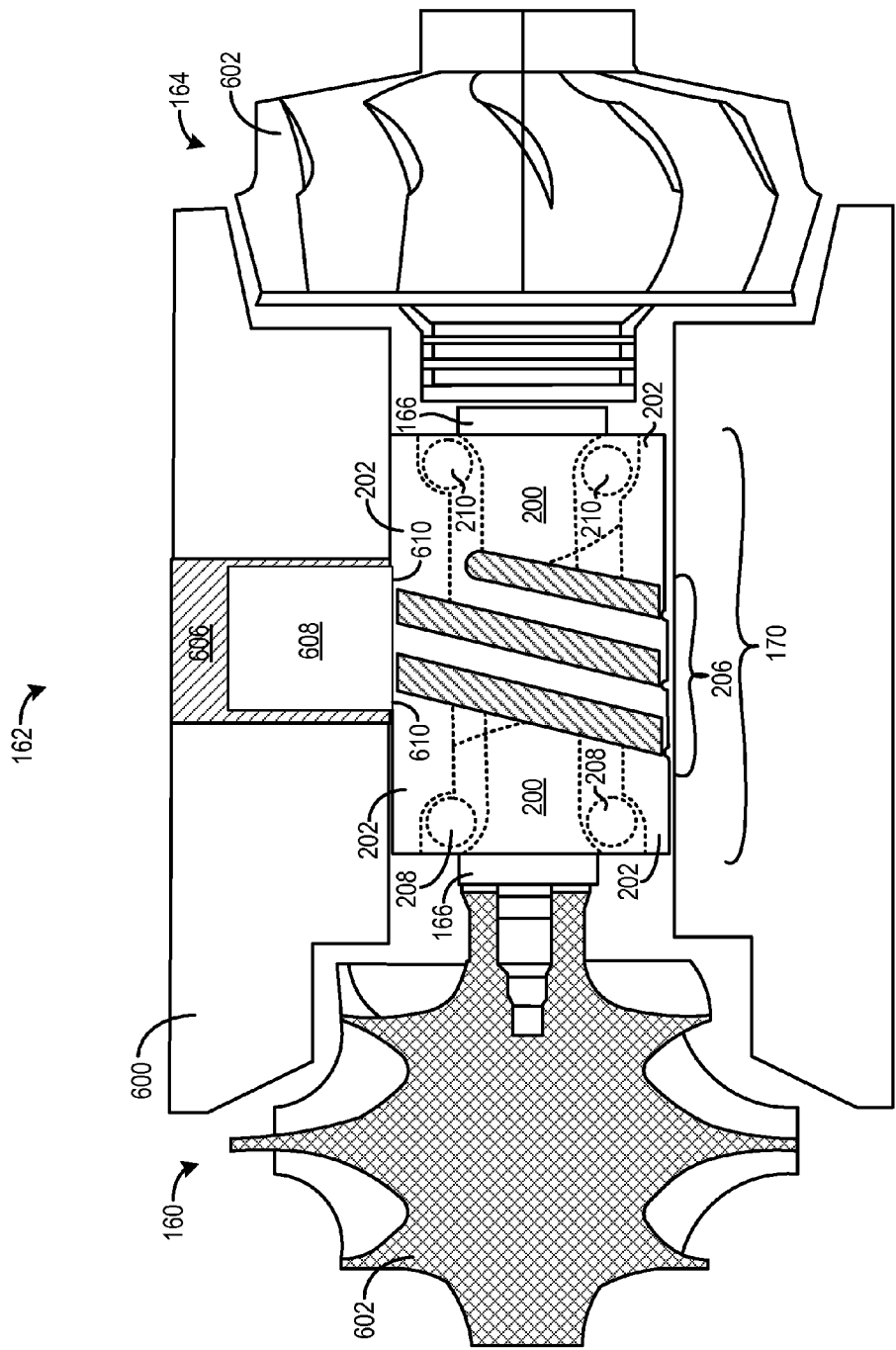
FIG. 6 shows an example turbocharger that may be included in the engine shown in FIG. 1, the turbocharger including the turbocharger bearing shown in FIG. 4.

FIG. 6 shows an example turbocharger 162 and the example turbocharger bearing 170, previously shown in FIG. 4. The turbocharger bearing 170 includes the pre-loading element 206. In some examples, the turbocharger 162 may not include any additional pre-loading components, if desired. The turbocharger 162 includes a housing 600. The compressor 160 and the turbine 164 are also shown in FIG. 6. The compressor 160 includes a compressor rotor 602. Additionally, the turbine 164 includes a turbine rotor 604. A lubrication passage 606 extends through the housing 600. The lubrication passage 606 may be in fluidic communication with a lubrication system included in the engine 10, shown in FIG. 1. The lubrication passage 606 opens into the pre-loading element 206 which in the example in FIG. 6 is a helical spring. Specifically, a lubrication outlet 607 opens into the pre-loading element 206. In this way, lubricant may flow through the helical spring to the first set of rolling elements 208 and the second set of rolling elements 210 and between the inner race 200 and the outer race 202.

In some examples, the compressor rotor 602 and/or turbine rotor 604 may not be coupled to the drive shaft 166 via threads. In such an example an attachment apparatus, such as a press-fit ring, a retaining ring (e.g., snap ring), or a weld, may couple the compressor rotor 602 and/or turbine rotor 604 to the drive shaft 166. However, in other examples threads may be used to couple the compressor and turbine rotors to the drive shaft.

A retention element 608 is also included in the turbocharger 162 shown in FIG. 6. The retention element 608 is in face sharing contact with an outer surface 610 of the outer race 202, in the depicted example. The retention element 608 is configured to reduce the axial movement of the turbocharger bearing 170. In the depicted example, the retention element 608 includes at least a retention pin. However other suitable retention elements have been contemplated.

Figure 7:
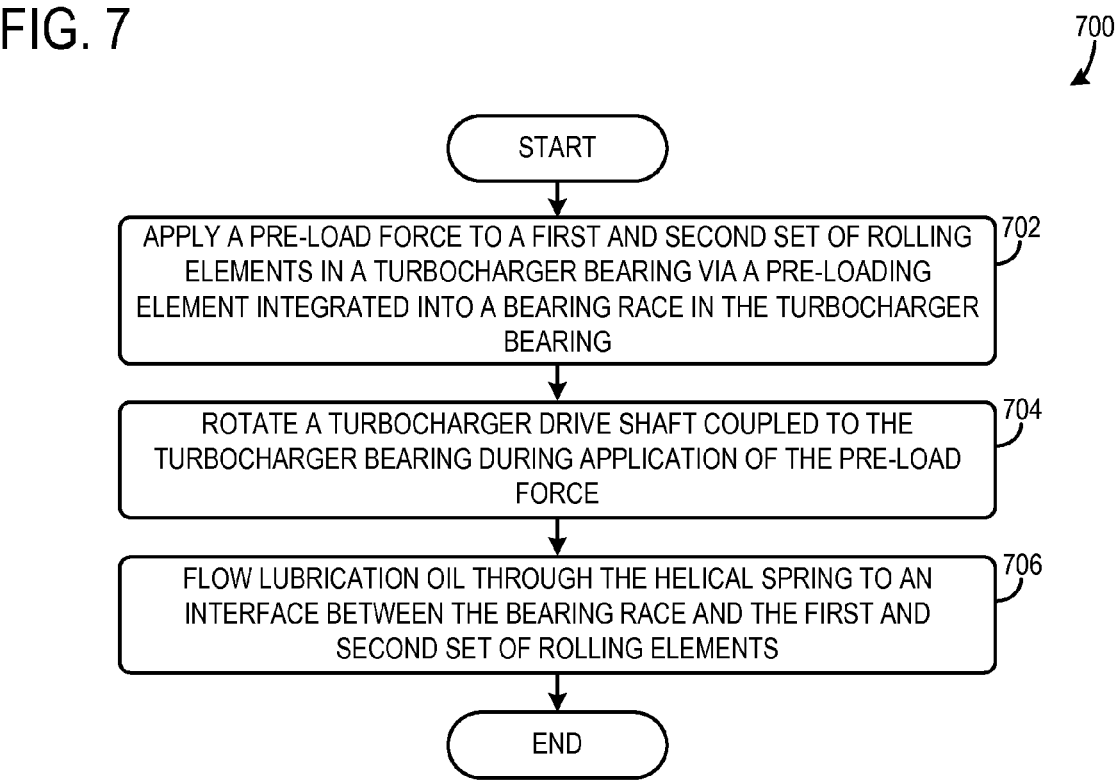
FIG. 7 shows a method for operation of a turbocharger.

FIG. 7 shows a method 700 for operation of a turbocharger. The method 700 may be implemented by the turbocharger discussed above with regard to FIGS. 1-6 or another suitable turbocharger.

At 702 the method includes applying a pre-load force to a first and second set of rolling elements in a turbocharger bearing via a pre-loading element integrated into a bearing race in the turbocharger bearing.

At 704 the method includes rotating a turbocharger drive shaft coupled to the turbocharger bearing during application of the pre-load force. In one example, the pre-loading element includes at least a helical spring. In such an example the method includes at 706 flowing lubrication oil through the helical spring to an interface between the bearing race and the first and second set of rolling elements. It will be appreciated that step 706 may be implemented in a bearing with the pre-loading element integrated into the outer race. Further in another example, when the helical spring is integrated into an inner race, lubricant may be flowed through an outer race.

Further in one example, the bearing race is an outer race and the pre-load force is applied in an outward direction. In another example, the bearing race is an inner race and the pre-load force is applied in an inward direction.

Although the turbocharger bearing is discussed above with regard to turbocharger applications in an engine it will be appreciated that the bearing may be used in other applications which may include but are not limited to transmissions, drivelines, geartrains, aircraft turbines geartrains, turbomachinery, and/or machinery drives and spindles.

Figure 8:
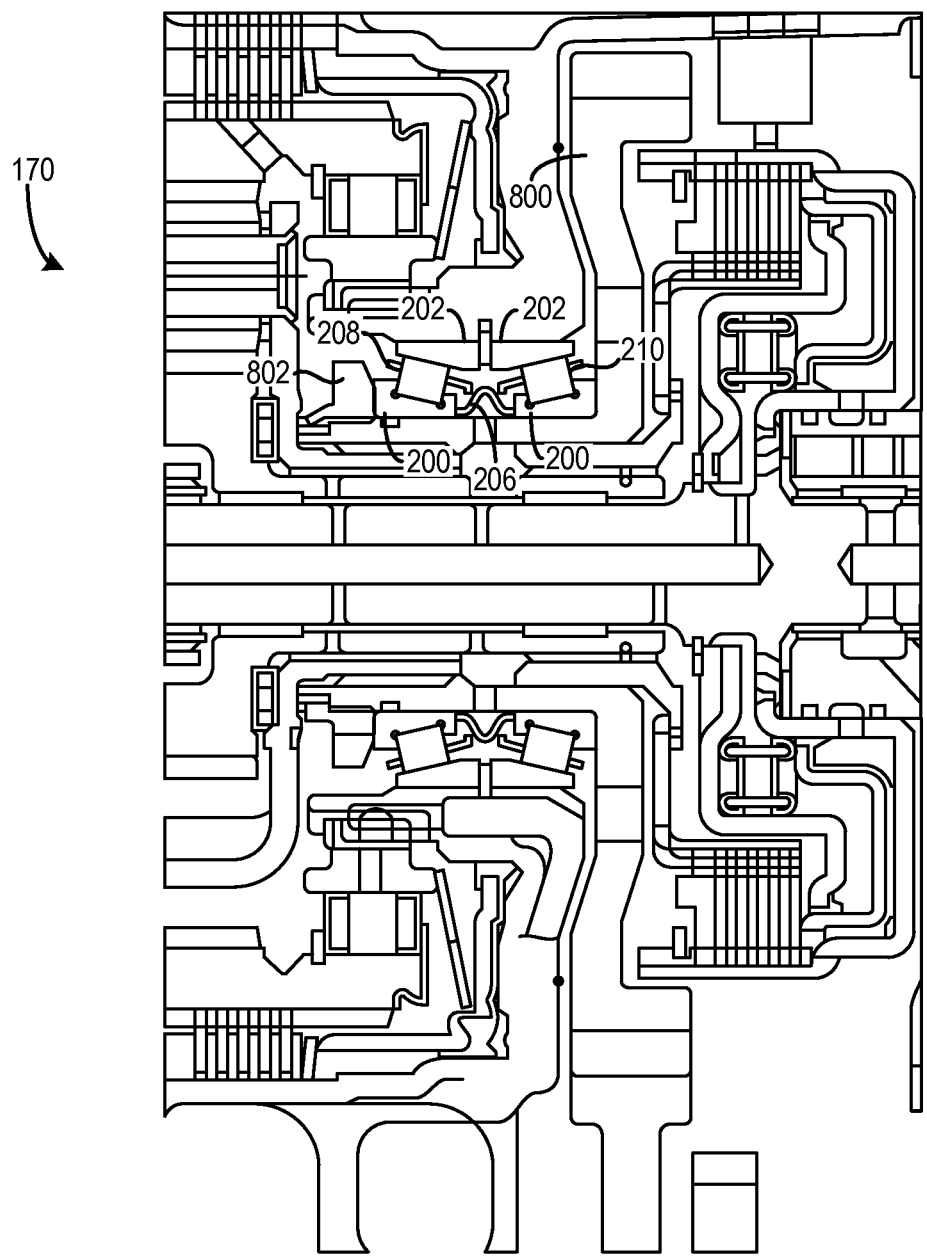
FIG. 8 shows another example turbocharger bearing that may be included in the turbocharger in the engine shown in FIG. 1.

FIG. 8 shows another example bearing 170 included in a geartrain application, the drawing to scale (although other relative dimensions may also be used). The first set of rolling elements 208 and the second set of rolling elements 210 are shown in FIG. 8 as cylindrical rollers. The pre-loading element 206 is also shown in FIG. 8. Specifically, the pre-loading element 206 is a preloaded "crush spacer" spring. However, other types of pre-loading elements have been contemplated. The pre-loading element 206 is integrated into the inner race 200. The outer race 202 is also shown in FIG. 8. A transmission gear 800 is coupled to the inner race 200. A retaining nut 802 is also shown coupled to the inner race 200 in FIG. 8. The retaining nut 802 is configured to load the pre-loading element 206. In other examples, a snap ring may be used in place of the retaining nut. When a snap ring is used in the geartrain the use of large nuts, threads, and/or staking may be negated, if desired. It will be appreciated that snap rings and grooves may be more robust than gear threads (e.g., hardened or masked gear threads).

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A bearing comprising:
   a first set of rolling elements;
   a second set of rolling elements spaced away from the first set of rolling elements;
   a race at least partially enclosing the first and second sets of rolling elements; and
   a pre-loading element in the race between two outer sections of the race applying pre-load forces to the first and second sets of rolling elements, where the race forms a single continuous piece of material.

2. The bearing of claim 1, where the rolling elements include bearing balls.

3. The bearing of claim 1, where the race is an outer race.

4. The bearing of claim 3, where the pre-load forces are applied in an outward direction.

5. The bearing of claim 1, where the race is an inner race.

6. The bearing of claim 5, where the pre-load forces are applied in an inward direction.

7. The bearing of claim 1, where the pre-loading element includes at least a helical spring.

8. The bearing of claim 7, where the helical spring comprises at least two coil starts.

9. The bearing of claim 1, further comprising a lubrication outlet opening into the pre-loading element in fluidic communication with a lubrication system.

10. The bearing of claim 1, further comprising a retention element in face sharing contact with an outer surface of the race, the race being an outer race.

11. The bearing of claim 10, where the retention element includes at least a retention pin.

12. A method for operating a turbocharger comprising:
    applying a pre-load force to a first and second set of rolling elements in a turbocharger bearing via a pre-loading element integrated into a bearing race in the turbocharger bearing, where the bearing race forms a single continuous piece of material; and
    rotating a turbocharger drive shaft coupled to the turbocharger bearing during application of the pre-load force.

13. The method of claim 12, where the bearing race is an outer race and the pre-load force is applied in an outward direction.

14. The method of claim 12, where the bearing race is an inner race and the pre-load force is applied in an inward direction.

15. The method of claim 12, where the pre-loading element includes at least a helical spring, the method further comprising flowing lubrication oil through the helical spring to an interface between the bearing race and the first and second set of rolling elements.

16. A bearing system comprising:
    a double row bearing including a first set of rolling elements connected to a second set of rolling elements by a spring coil integrated into a bearing race and exerting a pre-load force on the first set of rolling elements and the second set of rolling elements, where the bearing race forms a single continuous piece of material.

17. The bearing system of claim 16, where the bearing race is an inner race at least partially enclosing the first and second sets of rolling elements.

18. The bearing system of claim 16, where the bearing race is an outer race at least partially enclosing the first and second sets of rolling elements.

19. The bearing system of claim 16, where an attachment interface between a turbocharger rotor and a turbocharger drive shaft coupled to the bearing does not include the pre-load force.

* * * * *